United States Patent
De Leon et al.

(10) Patent No.: US 11,880,546 B2
(45) Date of Patent: Jan. 23, 2024

(54) PRESENTATION AND CONTROL OF USER INTERACTIONS WITH A USER INTERFACE ELEMENT

(71) Applicant: Capital One Services, LLC, McLean, VA (US)

(72) Inventors: Erik Jay Salazar De Leon, Richmond, VA (US); Thomas Dohan, II, Elmhurst, IL (US); Xiang Lan, South Orange, NJ (US); Vivian Wang, McLean, VA (US); Jennifer L. Ellison, New Kent, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/660,268

(22) Filed: Apr. 22, 2022

(65) Prior Publication Data
US 2023/0341996 A1    Oct. 26, 2023

(51) Int. Cl.
*G06F 3/048* (2013.01)
*G06F 3/0482* (2013.01)
*G06F 3/04886* (2022.01)

(52) U.S. Cl.
CPC ........ *G06F 3/0482* (2013.01); *G06F 3/04886* (2013.01); *G06F 2203/04803* (2013.01)

(58) Field of Classification Search
CPC ............... G06F 3/0482; G06F 3/04886; G06F 2203/04803
See application file for complete search history.

(56) References Cited

U.S. PATENT DOCUMENTS

| | | | |
|---|---|---|---|
| 10,798,030 B1* | 10/2020 | Igure | G06F 40/56 |
| 2014/0258323 A1 | 9/2014 | Mauro et al. | |
| 2015/0324080 A1* | 11/2015 | Jin | G06F 3/0481 715/784 |
| 2016/0071179 A1* | 3/2016 | Babcock | G06F 9/453 715/201 |
| 2016/0357409 A1* | 12/2016 | Gil | G06F 3/04845 |
| 2018/0239770 A1 | 8/2018 | Ghotbi et al. | |
| 2020/0226418 A1 | 7/2020 | Dorai-Raj et al. | |

FOREIGN PATENT DOCUMENTS

WO    2011088053 A2    7/2011

OTHER PUBLICATIONS

International Search Report and Written Opinion for Application No. PCT/US2023/016741, dated Jun. 30, 2023, 14 pages.

* cited by examiner

*Primary Examiner* — Claudia Dragoescu
(74) *Attorney, Agent, or Firm* — Harrity & Harrity, LLP (57) ABSTRACT

In some implementations, a system may transmit a first set of user interface (UI) data indicating a UI having a first interaction element. The system may receive interaction data indicating a user interaction with the first interaction element. The system may determine one or more suggestions to provide based on one or more factors related to account information associated with a user account. The system may transmit a second set of UI data associated with a UI element and that may indicate a first portion, extending downward from a top of a display of the user device, that may include one or more second interaction elements corresponding to the suggestions, and a second portion extending upward from a bottom of the display and including a virtual keyboard. An intermediate portion of the UI may be exposed through a gap between the first and second portions of the UI element.

20 Claims, 9 Drawing Sheets

PRESENTATION AND CONTROL OF USER INTERACTIONS WITH A USER INTERFACE ELEMENT

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

Some implementations described herein relate to a system for providing data for presentation of a user interface element. The system may include one or more memories and one or more processors communicatively coupled to the one or more memories. The one or more processors may be configured to transmit, to a user device of a user associated with a user account, a first set of user interface data indicating a user interface that has a first interaction element. The one or more processors may be configured to receive, from the user device, a first set of interaction data indicating a first user interaction, by the user, with the first interaction element. The one or more processors may be configured to determine one or more suggestions to provide to the user based on one or more factors related to account information associated with the user account. The one or more processors may be configured to transmit, to the user device and based on receiving the first set of interaction data, a second set of user interface data associated with the user interface element, wherein the second set of user interface data indicates: a first portion, of the user interface element, extending downward from a top of a display of the user device, wherein the first portion includes one or more second interaction elements corresponding to the one or more suggestions, and a second portion, of the user interface element extending upward from a bottom of the display of the user device, wherein the second portion includes a virtual keyboard, and wherein an intermediate portion of the user interface is exposed through a gap between the first portion of the user interface element and the second portion of the user interface element.

Some implementations described herein relate to a method for providing data for presentation of a user interface element. The method may include receiving, by a system having one or more processors and from a user device of a user associated with a user account, a first set of interaction data indicating a first user interaction, by the user, with an interaction element. The method may include determining, by the system, one or more suggestions to provide to the user based on one or more factors related to account information associated with the user account. The method may include transmitting, by the system and to the user device, based on receiving the first set of interaction data, a second set of user interface data associated with the user interface element, wherein the second set of user interface data indicates, a first portion extending downward from a top of a display of the user device, where the first portion includes one or more second interaction elements corresponding to the one or more suggestions, a second portion extending upward from a bottom of the display of the user device, where the second portion includes a virtual keyboard, and a gap between the first portion of the user interface element and the second portion of the user interface element. The method may include receiving, by the system and from the user device, input data indicating an input by the user. The method may include initiating, by the system and based on receiving the input data, connections with the user device and an agent device to establish communication between the agent device and the user device.

Some implementations described herein relate to a user device configured to present a user interface element. The user device may include a memory and one or more processors communicatively coupled to the memory. The one or more processors may be configured to present, on a first user interface associated with a user account, an interaction element. The one or more processors may be configured to detect a first user interaction, with the user device, that indicates the interaction element. The one or more processors may be configured to present, on a second user interface, associated with the user account and based on the first user interaction, a user interface element including: a first portion extending downward from a top of the user device and over a top portion of the first user interface, and a second portion extending upward from a bottom of the user device and over a bottom portion of the first user interface, wherein an intermediate portion of the first user interface is exposed through a gap between the first portion of the user interface element and the second portion of the user interface element, wherein the first portion of the user interface element includes one or more suggestions based on account information associated with the user account, and wherein the second portion of the user interface element includes an input user interface element.

DETAILED DESCRIPTION

The following detailed description of example implementations refers to the accompanying drawings. The same reference numbers in different drawings may identify the same or similar elements.

A user may have a user account (e.g., with an institution), which further may include or be associated with one or more sub-accounts. Often, the user may desire to access information related to one or more of the sub-accounts and/or may have questions or need help regarding one or more of the sub-accounts. In such scenarios, the user traditionally may be able to navigate to a help page with a list of frequently asked questions (FAQs). If the user is unable to find a topic of interest, the user may be provided with an option to speak with an agent (e.g., via a chat). However, the FAQs typically are collected and provided based on all users, and therefore are not tailored to a particular user. As a result, the user may require more time to search through all of the FAQs in order to find a relevant search topic. However, such a process requires a higher amount of computing resources for a back-end system and for the user device, and overall lacks efficiency. Additionally, having to navigate through multiple UIs to reach the FAQs and/or the particular topic further requires more computing resources for both the back-end system and for the user device. Accordingly, it is desirable to have a user interface (UI) that provides suggestions of search/help topics to a user device in an efficient and effective manner.

Some implementations described herein enable a system to provide data for presentation of a UI element on a user device that provides suggestions of search and/or help topics to a user. The system may determine the suggestions based on account information (e.g., historical interactions, recent searches, account types, account alerts, and/or account totals) associated with an account of the user. Based on a search or help request made by the user (e.g., by selecting a designated interaction element), the system may transmit UI data indicating a UI element to aid in the search/help process. The UI element may include a first portion extending in a downward direction from a top of the user device, and a second portion extending in an upward direction from a bottom of the user device. The first portion may include the interaction elements (e.g., buttons) corresponding to the suggestions. The second portion may include an input UI element (e.g., a virtual keyboard). By determining and providing suggestions to the user (e.g., via the user device), the UI element serves as an efficient system for providing help to the user with preset search/help topics. As a result, help for the particular search/help topics may be more quickly provided, thereby conserving computing resources and memory.

In some implementations described herein, the first portion and the second portion may be spaced apart from one another such that a gap exists between the first portion and the second portion. If the user interacts with the gap (e.g., touches or presses the gap), then the first portion and the second portion may be removed (e.g., the user may exit the UI element). If the user interacts with one of the interaction elements presented within the first portion of the UI element, then the system may connect the user device with an agent device to facilitate real-time communication between the user and an agent associated with the agent device. Additionally, based on the user interaction with one of the interaction elements, the first portion may extend through the gap to contact the second portion. As a result, the first portion maximizes the use of the available space of the display of the user device to improve visibility of the real-time conversation between the user and the agent. Furthermore, by initially including a gap between the first portion and the second portion of the UI element, the UI element does not occupy the entire screen space, and therefore computing resources may be reserved for facilitating the real-time conversation.

FIGS. 1A-1D are diagrams of an example 100 associated with presentation and control of user interactions with a user interface element. As shown in FIGS. 1A-1D, example 100 includes a processing system, a user profile database, a user device, and an agent device. These devices are described in more detail in connection with FIGS. 2 and 3.

Figure 1A:
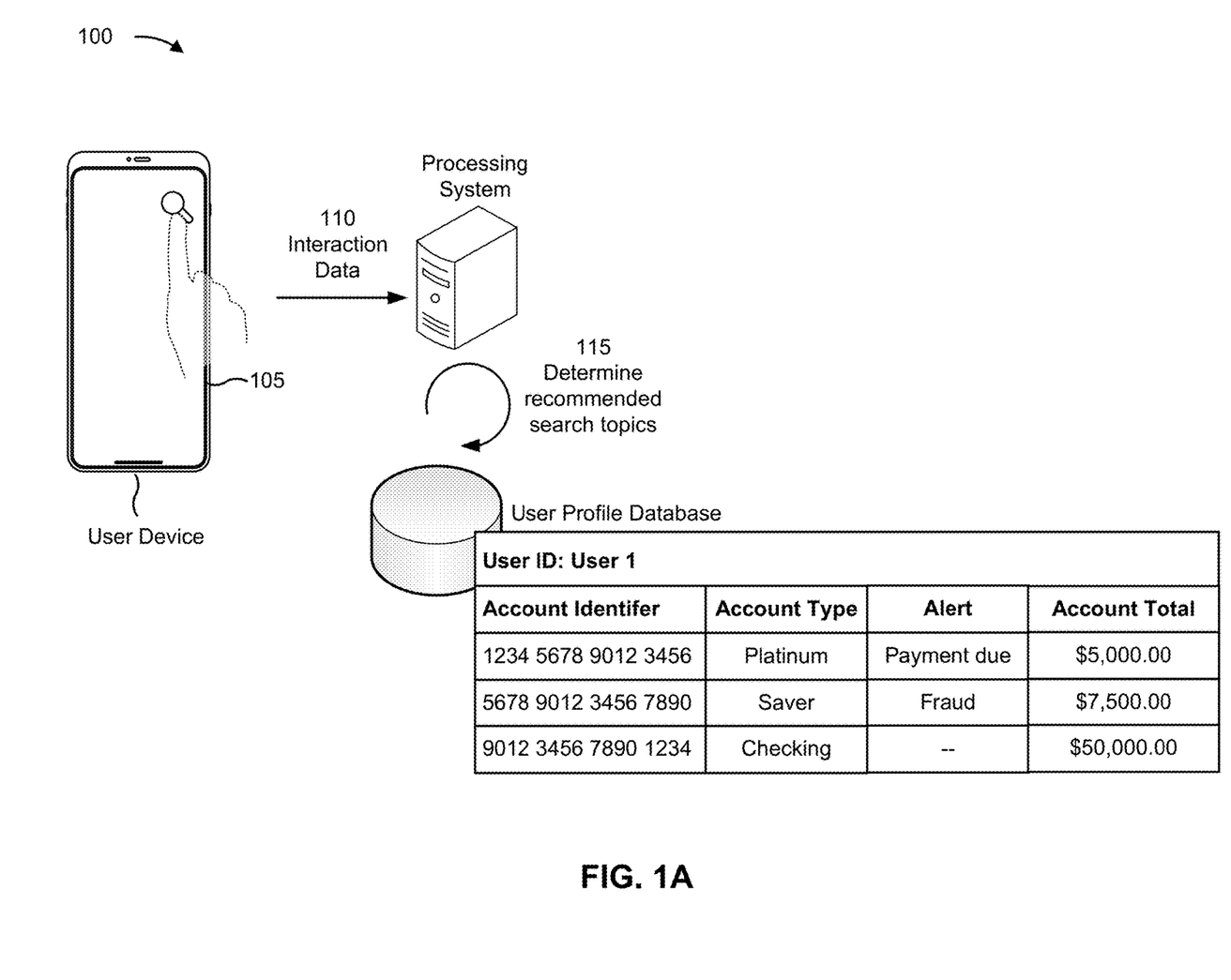
FIGS. 1A-1D are diagrams of an example implementation relating to presentation and control of user interactions with a user interface element.

As shown in FIG. 1A, a user may have a user account with an institution. Account information associated with the user and/or the user account may be stored in a user profile database under a user identifier (e.g., an account login name). The user account may be associated with one or more sub-accounts having corresponding account identifiers (e.g., an account ID number, a primary account number (PAN), or a virtual card number) associated with the user identifier and the user account. The sub-accounts may be associated with one or more account types (e.g., a checking account type, a credit account type, a savings account type, or a rewards account type). The account types may be associated with the account identifiers and stored as account information in the user profile database.

As further shown in FIG. 1A, the sub-accounts may have respective account totals (e.g., account balances or account rewards points) associated with the sub-accounts. Additionally, or alternatively, one or more of the sub-accounts may have one or more account alerts (e.g., fraud alerts or impending deadline alerts). The account totals and/or the account alerts may be associated with the respective account identifiers and stored as account information in the user profile database.

Additionally, the user profile database may store, as account information, records of historical interactions by the user via one or more of the sub-accounts. The historical interactions may include interactions by the user with one or more interaction parties (e.g., individuals, merchants, service providers, or institutions, such as financial or educational). The records of the historical interactions may include historical interaction information including respective dates, locations (e.g., zip code and/or geographic coordinates), interaction amounts, and/or interaction party identifiers (e.g., identifiers by which the interaction parties are identifiable) associated with the interactions.

The user may desire to obtain information and/or help with one or more aspects related to the user account and/or one or more of the sub-accounts. The user may access the user account via the user device (e.g., via an application installed on the user device or via a web-based application accessed by the user device over a network). After the user has accessed the user account (e.g., logged into the user account), the processing system may transmit, to the user device, a first set of UI data indicating a first UI associated with the user account. The first set of UI data may indicate a first interaction element, which the user device may present on the first UI. As shown by reference number 105, the user may interact with the first interaction element (e.g., by touching and/or pressing the first interaction element). The user device may detect the user interaction (also referred to as a first user interaction) that indicates the first interaction element (e.g., via a touchscreen display of the user device). As shown by reference number 110, the user device may transmit, and the processing system may receive, a first set of interaction data indicating the first user interaction, by the user, with the first interaction element. As shown by reference number 115, the processing system may determine one or more suggestions to provide to the user based on one or more factors related to account information associated with the user account.

In some implementations, one factor may be related to the historical interactions by the user. A more recent subset of the historical interactions may be used for determining the suggestions, such as interactions that occurred within a time threshold (e.g., 1 week, 30 days, 3 months) from the current date. For example, if one or more of the historical interactions within the time threshold have a large interaction amount (e.g., an amount more than an amount threshold above an average interaction amount of at least a subset of the historical interactions) and/or a suspicious location (e.g., a location more than a distance threshold from a location associated with the user account in the user profile database), then the suggestions may include reporting a suspicious interaction, viewing a credit report, locking the sub-account associated with the particular interaction, and/or paying a balance of the sub-account associated with the particular interaction. As another example, if one or more of the historical interactions within the time threshold is categorized within a particular category for which rewards points are provided (e.g., travel, entertainment, dining, or shopping), then the suggestions may include redeeming points, available rewards in the particular category, and/or viewing interactions (e.g., within the particular category). As another example, if a recent historical interaction within the time threshold was a withdrawal of cash or a transfer of funds, then the suggestions may include adding an authorized user to the user account and/or to one or more of the sub-accounts.

Additionally, or alternatively, another factor may be related to one or more alert types associated with the user account. For example, if one or more of the sub-accounts has a fraud alert, then the suggestions may include locking the sub-account, viewing a credit report, and/or viewing the interactions associated with the sub-account. As another example, if one or more of the sub-accounts has an impending action alert (e.g., to pay a balance), then the suggestions may include viewing the interaction associated with the one or more sub-accounts and/or paying the balance(s).

Additionally, or alternatively, another factor may be related to one or more account types associated with the user account and/or with the sub-accounts. For example, if a particular sub-account has a rewards account type (e.g., interactions may earn rewards points), then the suggestions may include redeeming the rewards points or viewing the interactions. As another example, if a particular sub-account has a checking or savings account type, then the suggestions may include transferring funds. As another example, if a particular sub-account has a credit account type, then the suggestions may include paying a balance, viewing interactions, viewing the credit report of the user, or locking the account.

Additionally, or alternatively, another factor may be associated to one or more account totals associated with the user account. For example, if a sub-account has a balance greater than an amount threshold, then the suggestions may be to pay the balance, view the interactions, or report suspicious activity. As another example, if a sub-account has rewards points greater than a rewards threshold, then the suggestion may be to redeem the points.

Additionally, or alternatively, another factor may be associated with recent searches performed by the user (e.g., searches that the user made within a time threshold). For example, if the user performed a search regarding what the user's recent purchases were and/or a search regarding details of a particular sub-account, then the suggestions may include reporting suspicious activity, viewing the transactions, viewing the credit report of the user, and/or locking the sub-account.

In some implementations, the processing system may use a machine learning model to determine the suggestions of the search queries. The machine learning model may be trained to determine the suggestions based on historical training data. The processing system may update the machine learning model based on feedback data (e.g., a user-specified input of the search query received from the user device, as described in more detail below).

Figure 1B:
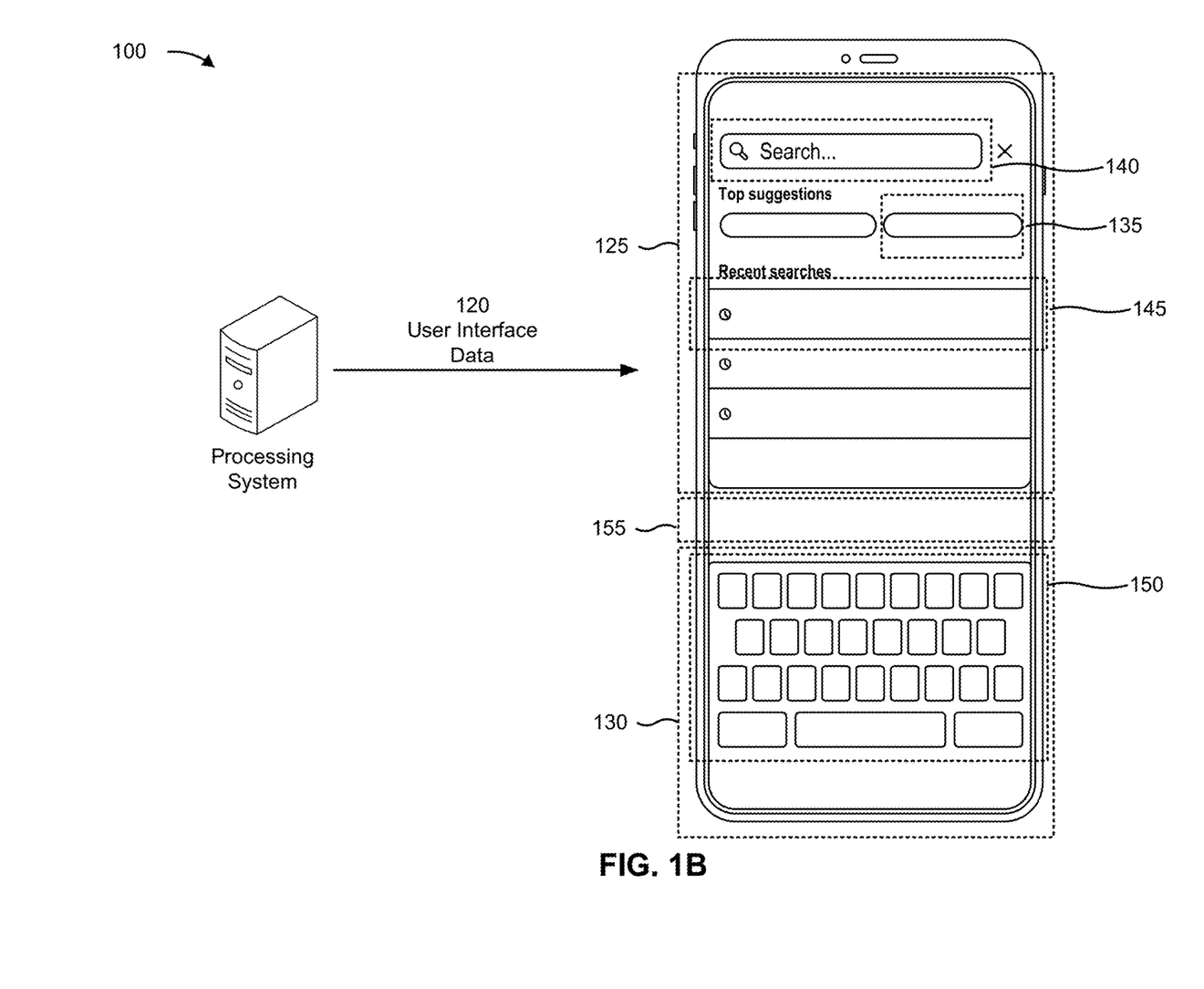

As shown in FIG. 1B and by reference number 120, the processing system may transmit, and the user device may receive, a second set of UI data indicating a second UI associated with the user account. The user device may present the UI element on the second UI. As shown in FIG. 1B, the UI element, as indicated by the second set of user interface data, may include a first portion 125 extending downward from a top of a display of the user device over a top portion of the first UI, and a second portion 130 extending upward from a bottom of the display of the user device over a bottom portion of the first UI.

The first portion 125 may include one or more second interaction elements 135, which may correspond to the one or more suggestions. Additionally, or alternatively, the second set of UI data may indicate a dedicated entry field 140, presented within the first portion 125, in which the user may manually enter a particular search query. Additionally, or alternatively, the first portion 125 may include one or more third interaction elements 145, which may correspond to one or more recent searches performed by the user.

The second portion 130 may include an input UI element 150 by which the user may manually enter the search query in the dedicated entry field 140 in the first portion 125. The input UI element may include a virtual keyboard, as shown in FIG. 1B, a microphone element (not shown) by which the user may activate a microphone of the user device, and/or a virtual pad (not shown) by which the user may write the search query (e.g., via the user's finger and/or a stylus on the touchscreen of the user device).

Figure 1C:
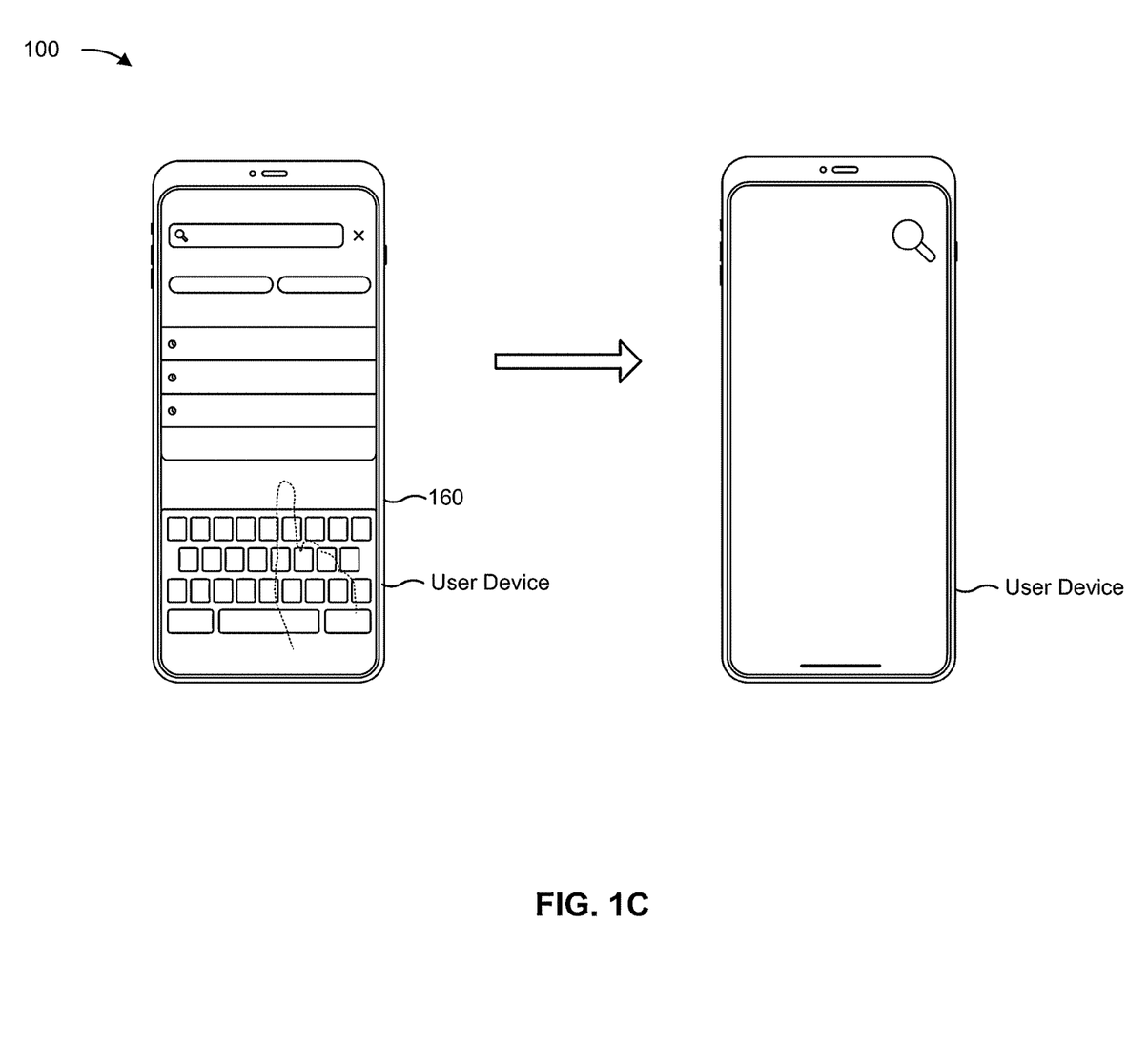

As shown in FIG. 1B, the first portion 125 and the second portion 130 may be spaced apart to result in a gap 155 between the first portion 125 (e.g., a bottom edge of the first portion 125) and the second portion 130 (e.g., a top edge of the second portion 130). An intermediate portion of the first UI may be exposed (e.g., visible) through the gap 155. As shown in FIG. 1C and by reference number 160, the user may interact with (e.g., touch and/or press) the intermediate portion of the first UI. For example, the user device may detect the user interaction (e.g., also referred to as a second user interaction) with the intermediate portion of the first UI. Based on the second user interaction, the user device may remove, from the second UI, the UI element (e.g., the first portion 125 and the second portion 130) to expose the top portion and bottom portion of the first UI. As a result, the user may effectively exit the second UI.

Figure 1D:
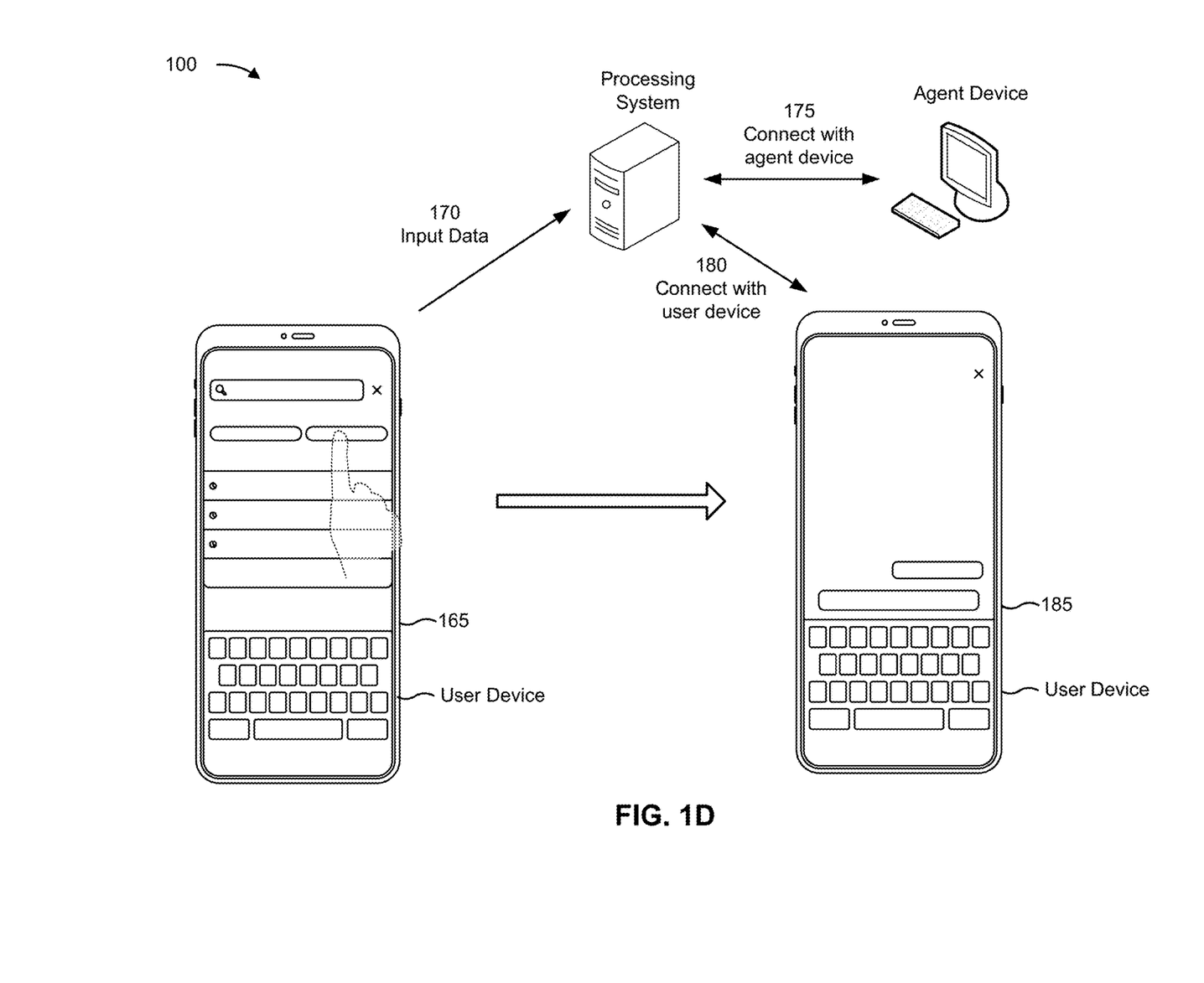

As shown in FIG. 1D and by reference number 165, the user may interact with a portion of the first portion of the UI element to provide a particular input (e.g., a search or help topic) to the processing system. For example, the user may interact with (e.g., select) one of the second interaction elements (e.g., suggestions) or third interaction elements (e.g., recent searches), such as by touching and/or pressing the particular second interaction element or third interaction element. The user device may detect the user interaction (also referred to as a second user interaction) with the second interaction element and the third interaction element. Alternatively, as explained above, the user may manually enter an input (e.g., a search query) in the entry field, presented in the first portion of the UI element, via the input UI element presented in the second portion of the UI element. As shown by reference number 170, the user device may transmit, and the processing system may receive, input data (e.g., selection data indicating the second or third interaction element or the user-specified data) indicating the input (e.g., the search or help topic) by the user. As shown by reference numbers 175 and 180, the processing system may initiate a single connection or multiple connections in real-time with an agent device, of an agent of the institution, and with the user device to establish communication between the user device and the agent device such that the agent may assist the user with the particular search query.

Additionally, as shown by reference number 185, based on the second user interaction with one of the second interaction elements or third interaction elements, the first portion of the UI element may transition into a live chat window via which the user may communicate with the agent in real time. The first portion of the UI element may include an entry field in which the user may input, via the input UI element in the second portion of the UI element, a message to the agent. The first portion of the UI element also may include a transcript of at least a subset of messages from the user and from the agent.

As further shown by reference number 185, to transition into the live chat window, the user device may present, on the second UI and as indicated by the second set of UI data, the first portion of the UI element extending to contact the second portion of the UI element to remove the gap. As a result, the UI element may utilize the maximize available space of the second UI on the display of the user device to facilitate the real-time conversation between the user and the agent.

Using the techniques described herein, a system may provide UI data indicating a UI element, and a user device may present, on a UI, the UI element that provides user-friendly visualization of suggestions for search or help topics. The UI element is able to present the suggestions tailored to the user's particular account information and activity, thereby efficiently providing the help process to the user. Additionally, by initially including first and second portions of the UI element that do not occupy the entire display of the user device (e.g., have a gap between the first and second portions), the system and the user device are able to conserve computing resources by providing an efficiently packaged UI that enables the user to either exit the support or continue with additional support by connecting in real-time with a support agent.

As indicated above, FIGS. 1A-1D are provided as an example. Other examples may differ from what is described with regard to FIGS. 1A-1D. For example, although implementations are described herein in connection with the first portion of the UI element extending downwards from the top of the user device and the second portion of the UI element extending upwards from the bottom of the user device, techniques described herein may be used for any directional extension (e.g., from the left or from the right side of the user device) of the first portion and/or the second portion.

Figure 2:
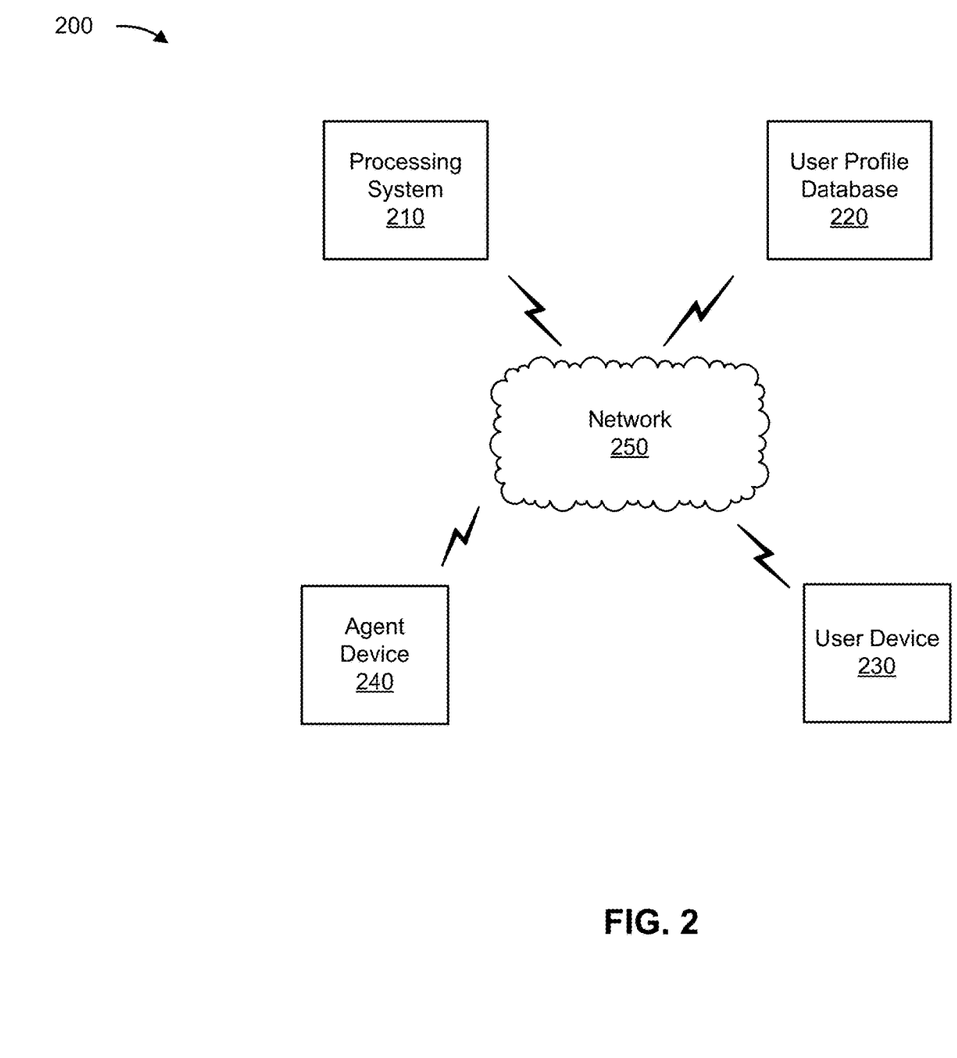
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a processing system 210, a user profile database 220, a user device 230, an agent device 240, and a network 250. Devices of environment 200 may interconnect via wired connections, wireless connections, or a combination of wired and wireless connections.

The processing system 210 includes one or more devices capable of receiving, generating, storing, processing, providing, and/or routing information associated with presentation and control of user interaction with a user interface element, as described elsewhere herein. The processing system 210 may include a communication device and/or a computing device. For example, the processing system 210 may include a server, such as an application server, a client server, a web server, a database server, a host server, a proxy server, a virtual server (e.g., executing on computing hardware), or a server in a cloud computing system. In some implementations, the processing system 210 includes computing hardware used in a cloud computing environment.

The user profile database 220 includes one or more devices capable of receiving, generating, storing, processing, and/or providing information associated with presentation and control of user interaction with a user interface element, as described elsewhere herein. The user profile database 220 may include a communication device and/or a computing device. For example, the user profile database 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 220 may store information associated with users and/or one or more accounts of a user, such as interaction data associated with interactions between the user and an interaction party, as described elsewhere herein.

The user device 230 includes one or more devices capable of receiving, generating, storing, processing, and/or providing information associated with presentation and control of user interactions with a time-dependent user interface element, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The agent device 240 includes one or more devices capable of receiving, generating, storing, processing, and/or providing information associated with presentation and control of user interactions with a time-dependent user interface element, as described elsewhere herein. The agent device 240 may include a communication device and/or a computing device. For example, the agent device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
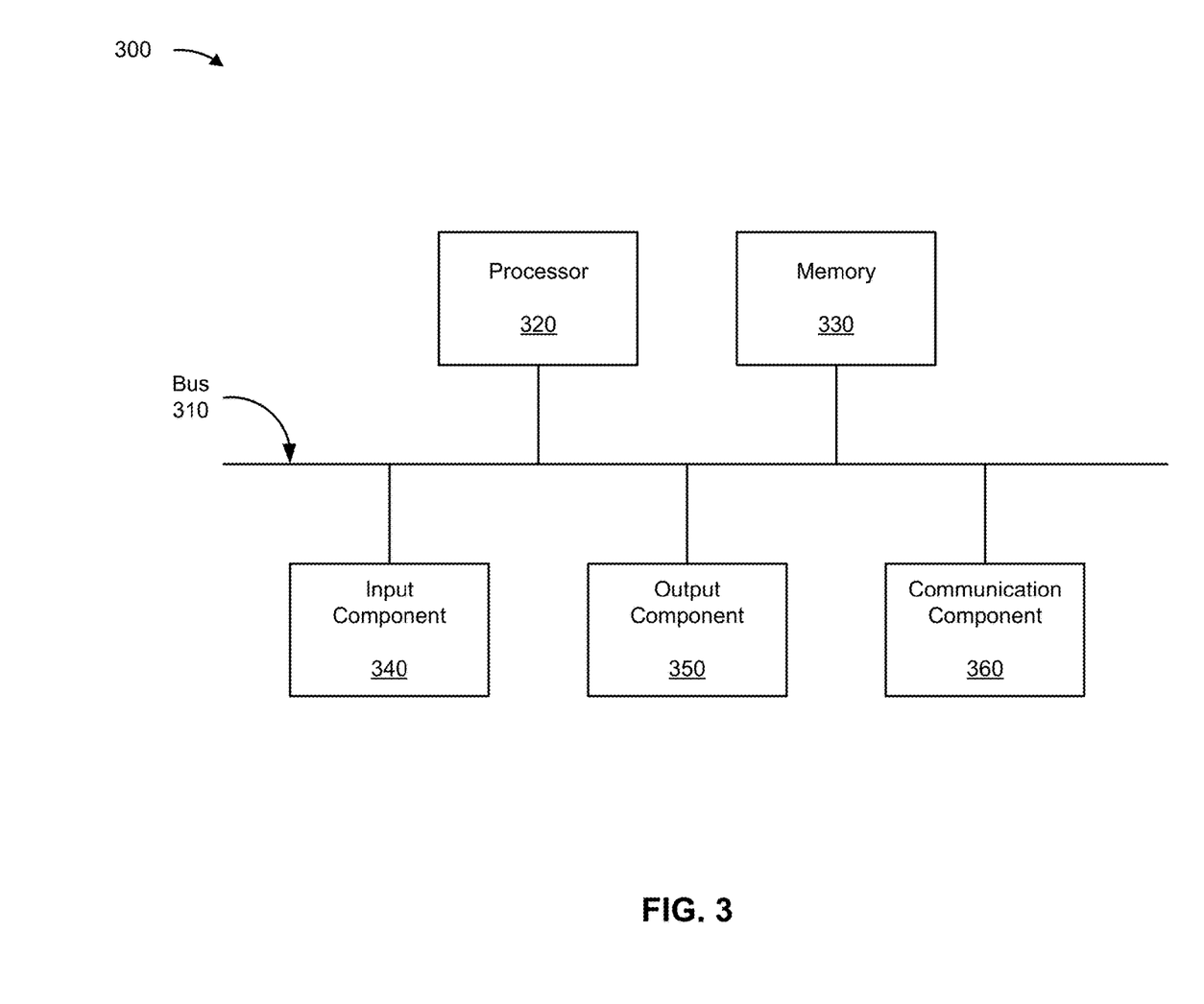
FIG. 3 is a diagram of example components of one or more devices of FIG. 2.

FIG. 3 is a diagram of example components of a device 300, which may correspond to processing system 210, user profile database 220, and/or user device 230. In some implementations, processing system 210, user profile database 220, and/or user device 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
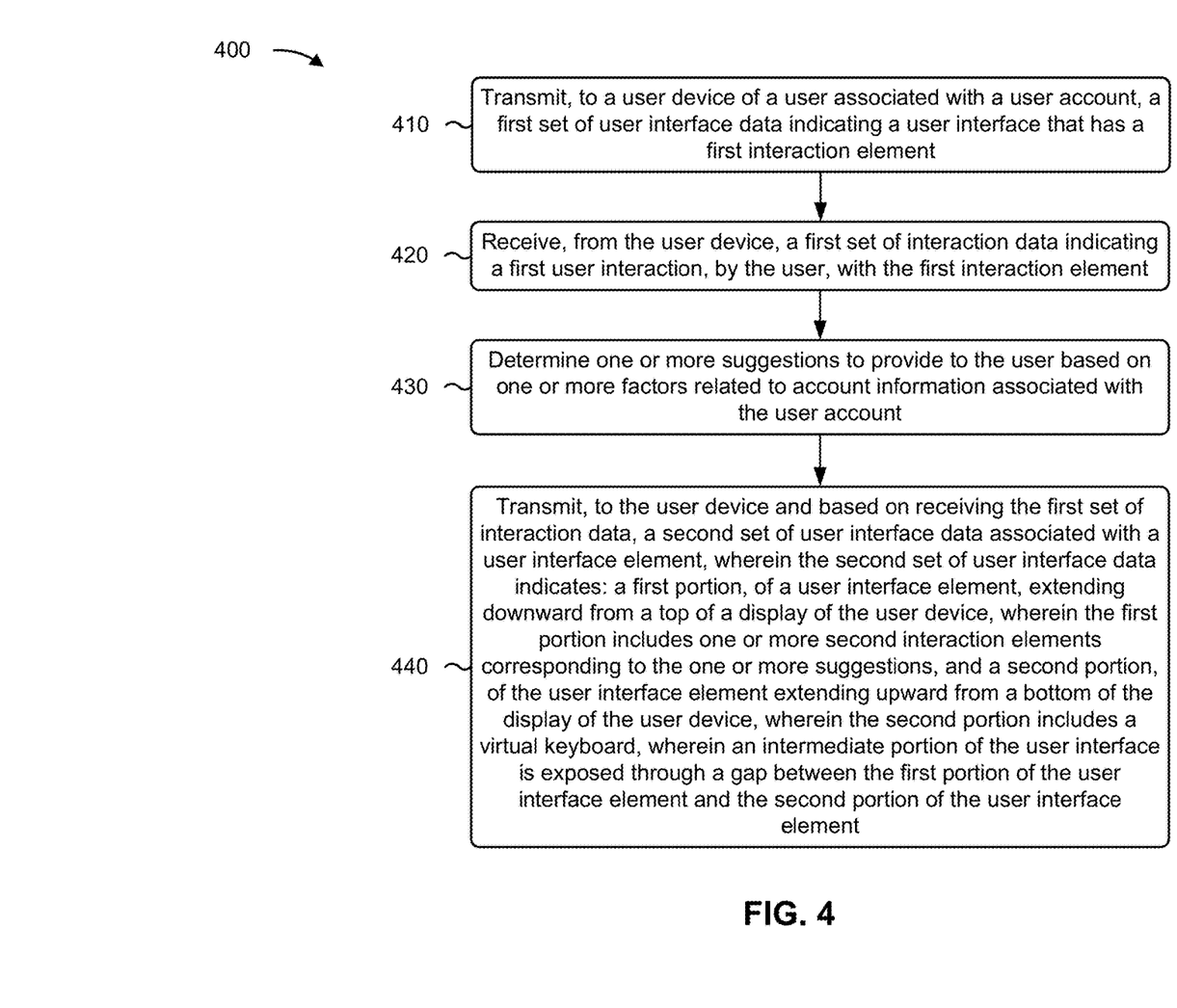
FIGS. 4-6 are flowcharts of example processes relating to presentation and control of user interactions with a user interface element.

FIG. 4 is a flowchart of an example process 400 associated with presentation and control of user interactions. In some implementations, one or more process blocks of FIG. 4 may be performed by the processing system 210. In some implementations, one or more process blocks of FIG. 4 may be performed by another device or a group of devices separate from or including the processing system 210, such as the user device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include transmitting, to a user device of a user associated with a user account, a first set of UI data indicating a UI that has a first interaction element (block 410). For example, the processing system 210 (e.g., using processor 320, memory 330, and/or communication component 360) may transmit, to a user device of a user associated with a user account, a first set of UI data indicating a UI that has a first interaction element, as described above in connection with reference number 105 of FIG. 1A. As an example, the UI, as transmitted by the processing system and including the first interaction element, may be presented on a display of the user device.

As further shown in FIG. 4, process 400 may include receiving, from the user device, a first set of interaction data indicating a first user interaction, by the user, with the first interaction element (block 420). For example, the processing system 210 (e.g., using processor 320, memory 330, input component 340, and/or communication component 360) may receive, from the user device, a first set of interaction data indicating a first user interaction, by the user, with the first interaction element, as described above in connection with reference number 110 of FIG. 1A. As an example, the user may interact with (e.g., touch and/or press) the first interaction element, which may be detected by the user device. Based on the user interaction, the user device may transmit, and the processing system may receive, interaction data indicating the user interaction.

As further shown in FIG. 4, process 400 may include determining one or more suggestions to provide to the user based on one or more factors related to account information associated with the user account (block 430). For example, the processing system 210 (e.g., using processor 320 and/or memory 330) may determine one or more suggestions to provide to the user based on one or more factors related to account information associated with the user account, as described above in connection with reference number 115 of FIG. 1A. As an example, the processing system may access account information from the user account of the user and stored on the user profile database. The account information may include one or more account identifiers associated with the user account, respective account types, alerts, and/or account totals associated with the account identifiers, and the one or more factors may be based on such account information.

As further shown in FIG. 4, process 400 may include transmitting, to the user device and based on receiving the first set of interaction data, a second set of UI data associated with a UI element (block 440). The second set of UI data may indicate: a first portion, of the UI element, extending downward from a top of a display of the user device. The first portion may include one or more second interaction elements corresponding to the one or more suggestions, and a second portion, of the UI element, extending upward from a bottom of the display of the user device. The second portion may include a virtual keyboard, wherein an intermediate portion of the UI may be exposed through a gap between the first portion of the UI element and the second portion of the UI element. For example, the processing system 210 (e.g., using processor 320, memory 330, and/or communication component 360) may transmit, to the user device and based on receiving the first set of interaction data, a second set of UI data associated with the UI element, as described above in connection with reference number 120 of FIG. 1B. As an example, the second set of UI data may indicate a first portion 125 and a second portion 130 of the UI element that are spaced apart to result in a gap 155 between the first portion 125 and the second portion. An intermediate portion of the UI may be exposed (e.g., visible) through the gap 155.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D.

Figure 5:
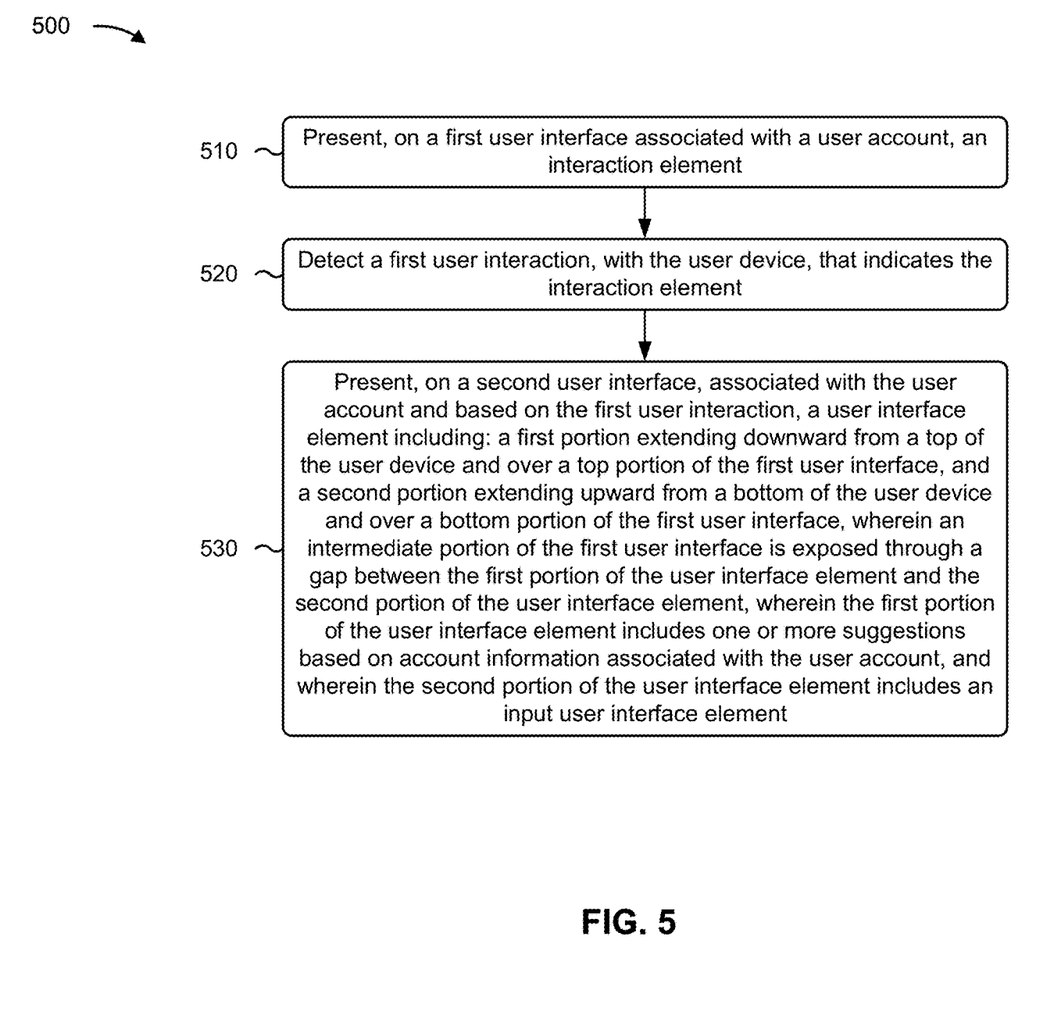

FIG. 5 is a flowchart of an example process 500 associated with presentation and control of user interactions. In some implementations, one or more process blocks of FIG. 5 may be performed by the user device 230. In some implementations, one or more process blocks of FIG. 5 may be performed by another device or a group of devices separate from or including the user device 230, such as the processing system 210. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include presenting, on a first UI associated with a user account, an interaction element (block 510). For example, the user device 230 (e.g., using processor 320, memory 330, and/or output component 350) may present, on a first UI associated with a user account, an interaction element, as described above in connection with reference number 105 of FIG. 1A.

As further shown in FIG. 5, process 500 may include detecting a first user interaction, with the user device, that indicates the interaction element (block 520). For example, the user device 230 (e.g., using processor 320 and/or memory 330) may detect a first user interaction, with the user device, that indicates the interaction element, as described above in connection with reference number 105 of FIG. 1A.

As further shown in FIG. 5, process 500 may include presenting, on a second UI, associated with the user account and based on the first user interaction, a UI element including: a first portion extending downward from a top of the user device and over a top portion of the first user interface, and a second portion extending upward from a bottom of the user device and over a bottom portion of the first user interface (block 530), An intermediate portion of the first UI may be exposed through a gap between the first portion of the UI element and the second portion of the UI element. The first portion of the UI element may include one or more suggestions based on account information associated with the user account. The second portion of the UI element may include an input UI element. For example, the user device 230 (e.g., using processor 320, memory 330, and/or output component 350) may present, on a second associated with the user account and based on the first user interaction, a UI element, as described above in connection with FIG. 1B. As an example, the UI element may include a first portion 125 and a second portion 130 that are spaced apart to result in a gap 155 between the first portion 125 and the second portion 130. An intermediate portion of the first UI may be exposed (e.g., visible) through the gap 155.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D.

Figure 6:
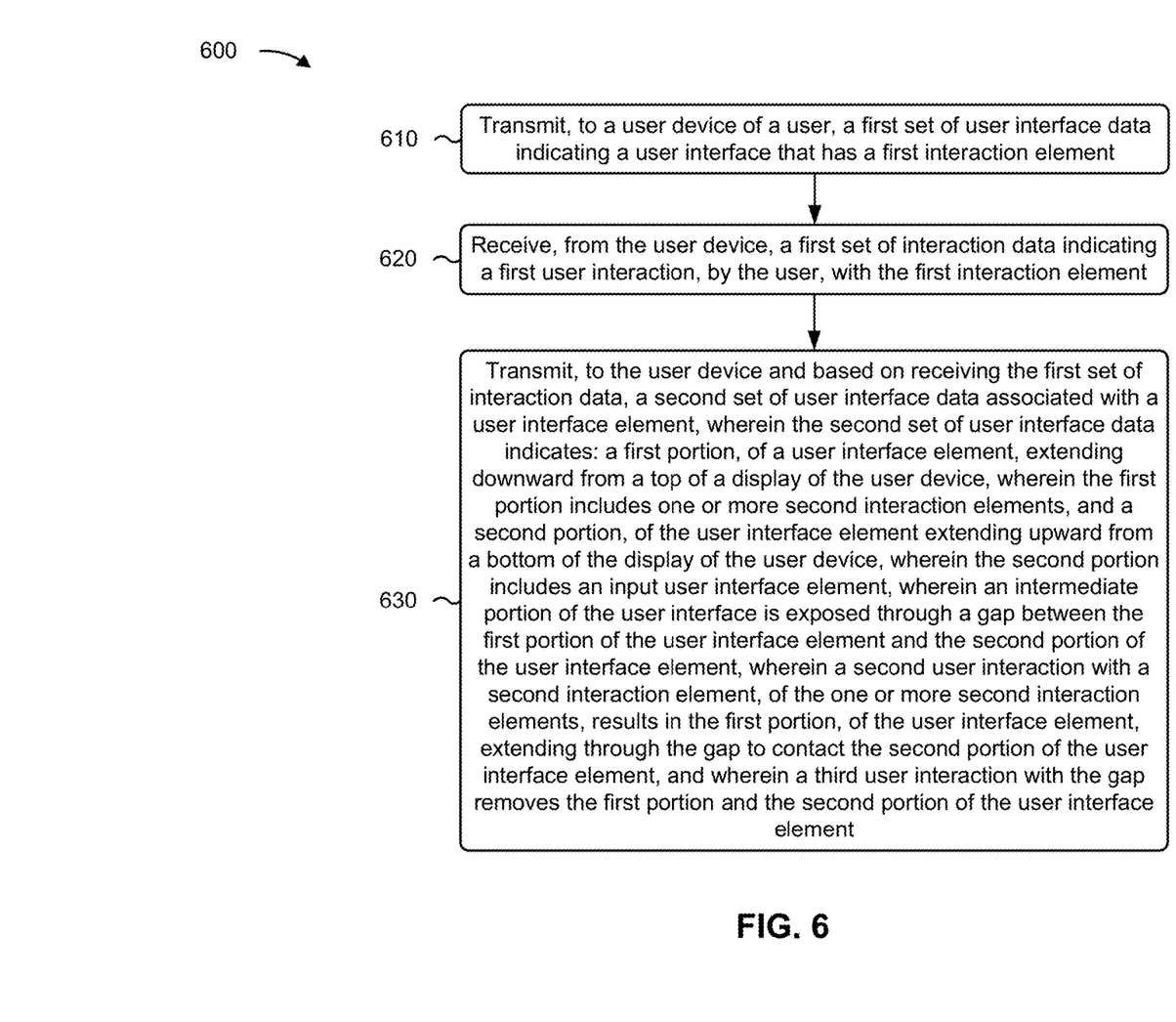

FIG. 6 is a flowchart of an example process 600 associated with presentation and control of user interactions with a UI element. In some implementations, one or more process blocks of FIG. 6 may be performed by a system (e.g., processing system 210). In some implementations, one or more process blocks of FIG. 6 may be performed by another device or a group of devices separate from or including the system, such as user device 230. Additionally, or alternatively, one or more process blocks of FIG. 6 may be performed by one or more components of device 300, such as processor 320, memory 330, input component 340, output component 350, and/or communication component 360.

As shown in FIG. 6, process 600 may include transmitting, to a user device of a user, a first set of UI data indicating a UI that has a first interaction element (block 610). For example, the processing system 210 (e.g., using processor 320, memory 330, and/or communication component 360) may transmit, to a user device of a user, a first set of UI data indicating a UI that has a first interaction element, as described above in connection with reference number 105 of FIG. 1A. As an example, the UI, as transmitted by the processing system and including the first interaction element, may be presented on a display of the user device.

As further shown in FIG. 6, process 600 may include receiving, from the user device, a first set of interaction data indicating a first user interaction, by the user, with the first interaction element (block 620). For example, the processing system 210 (e.g., using processor 320, memory 330, input component 340, and/or communication component 360) may receive, from the user device, a first set of interaction data indicating a first user interaction, by the user, with the first interaction element, as described above in connection with reference number 110 of FIG. 1A. As an example, the user may interact with (e.g., touch and/or press) the first interaction element, which may be detected by the user device. Based on the user interaction, the user device may transmit, and the processing system may receive, interaction data indicating the user interaction.

As further shown in FIG. 6, process 600 may include transmitting, to the user device and based on receiving the first set of interaction data, a second set of UI data associated with a UI element (block 630). The second set of UI data may indicate a first portion, of the UI element, extending downward from a top of a display of the user device, wherein the first portion may include one or more second interaction elements, and a second portion, of the UI element extending upward from a bottom of the display of the user device, wherein the second portion may include an input UI element. An intermediate portion of the UI may be exposed through a gap between the first portion of the UI element and the second portion of the UI element. A second user interaction with a second interaction element, of the one or more second interaction elements, may result in the first portion, of the UI element, extending through the gap to contact the second portion of the UI element. A third user interaction with the gap may remove the first portion and the second portion of the UI element. For example, the processing system 210 (e.g., using processor 320, memory 330, and/or communication component 360) may transmit, to the user device and based on receiving the first set of interaction data, a second set of UI data associated with a UI element, as described above in connection with reference number 120 of FIG. 1B. As an example, the second set of UI data may indicate a first portion 125 and a second portion 130 of the UI element that are spaced apart to result in a gap 155 between the first portion 125 and the second portion. An intermediate portion of the UI may be exposed (e.g., visible) through the gap 155.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1D.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing data for presentation of a user interface element, the system comprising:
   one or more memories; and
   one or more processors, coupled to the one or more memories, configured to:
   transmit, to a user device of a user associated with a user account, a first set of user interface data indicating a user interface that has a first interaction element;
   receive, from the user device, a first set of interaction data indicating a first user interaction, by the user, with the first interaction element;
   determine one or more suggestions to provide to the user based on one or more factors related to account information associated with the user account; and
   transmit, to the user device and based on receiving the first set of interaction data, a second set of user interface data associated with the user interface element, wherein the second set of user interface data indicates:
      a first portion, of the user interface element, extending downward from a top of a display of the user device, wherein the first portion includes one or more second interaction elements corresponding to the one or more suggestions, and wherein the first portion transitions to a live chat window based on a second set of interaction data indicating a second user interaction, by the user, with a second interaction element of the one or more second interaction elements, and
a second portion, of the user interface element, extending upward from a bottom of the display of the user device, wherein the second portion includes a virtual keyboard,
wherein, independent of an input entered by the user, an intermediate portion of the user interface is exposed through a gap between the first portion of the user interface element and the second portion of the user interface element.

2. The system of claim 1, wherein one or more account identifiers are associated with the user account, and
wherein the account information is associated with at least one of the one or more account identifiers.

3. The system of claim 2, wherein a factor, of the one or more factors, is related to one or more account types associated with the one or more account identifiers.

4. The system of claim 2, wherein a factor, of the one or more factors, is related to one or more account totals associated with the one or more account identifiers.

5. The system of claim 2, wherein a factor, of the one or more factors, is related to one or more alert types associated with the one or more account identifiers.

6. The system of claim 1, wherein the account information includes historical interaction information associated with a plurality of historical interactions by the user, and
wherein a factor, of the one or more factors, is related to one or more of the historical interactions.

7. The system of claim 1, wherein the one or more processors are further configured to:
receive, from the user device, the second set of interaction data indicating the second user interaction, and
initiate, based on receiving the second set of interaction data, connections with the user device and an agent device to establish communication between the agent device and the user device.

8. The system of claim 1, wherein the second set of user interface data indicates an entry field presented within the first portion of the user interface element, and
wherein the one or more processors are further configured to:
receive, from the user device, user-specified data indicating a second input entered by the user in the entry field; and
initiate, based on receiving the user-specified data, one or more connections with the user device and an agent device to establish communication between the agent device and the user device.

9. A method for providing data for presentation of a user interface element, comprising:
receiving, by a system having one or more processors and from a user device of a user associated with a user account, a first set of interaction data indicating a first user interaction, by the user, with an interaction element of a user interface;
determining, by the system, one or more suggestions to provide to the user based on one or more factors related to account information associated with the user account;
transmitting, by the system and to the user device, based on receiving the first set of interaction data, a second set of user interface data associated with the user interface element, wherein the second set of user interface data indicates:
a first portion extending downward from a top of a display of the user device, wherein the first portion includes one or more second interaction elements corresponding to the one or more suggestions, and wherein the first portion transitions to a live chat window based on input data indicating a second input by the user,
a second portion extending upward from a bottom of the display of the user device, wherein the second portion includes a virtual keyboard, and
a gap between the first portion of the user interface element and the second portion of the user interface element,
wherein, independent of an input entered by the user, an intermediate portion of the user interface is exposed through the gap;
receiving, by the system and from the user device, the input data indicating the second input by the user; and
initiating, by the system and based on receiving the input data, connections with the user device and an agent device to establish communication between the agent device and the user device.

10. The method of claim 9, wherein a factor, of the one or more factors, is related to one or more account types associated with the user account.

11. The method of claim 9, wherein a factor, of the one or more factors, is related to one or more account totals associated with the user account.

12. The method of claim 9, wherein a factor, of the one or more factors, is related to one or more alert types associated with the user account.

13. The method of claim 9, wherein the account information includes a plurality of historical interactions by the user, and
wherein a factor, of the one or more factors, is related to one or more of the historical interactions.

14. The method of claim 9, further comprising:
updating, based on receiving the second set of interaction data, the second set of user interface data to indicate the first portion of the user interface element extending through the gap to contact the second portion of the user interface element.

15. The method of claim 9, wherein the input data indicates a selection, by the user, of a second interaction element of the one or more second interaction elements.

16. The method of claim 9, wherein the second set of user interface data indicates an entry field presented within the first portion of the user interface element, and
wherein the input data indicates the second input by the user in the entry field.

17. A user device configured to present a user interface element, comprising:
one or more memories; and
one or more processors, coupled to the one or more memories, configured to:
present, on a first user interface associated with a user account, an interaction element;
detect a first user interaction, with the user device, that indicates the interaction element; and
present, on a second user interface, associated with the user account and based on the first user interaction, a user interface element including:
a first portion extending downward from a top of the user device and over a top portion of the first user interface, wherein the first portion transitions to a live chat window based on a second user interaction with the first portion, and a second portion extending upward from a bottom of the user device and over a bottom portion of the first user interface,
    wherein, independent of an input entered by a user, an intermediate portion of the first user interface is exposed through a gap between the first portion of the user interface element and the second portion of the user interface element,
    wherein the first portion of the user interface element includes one or more suggestions based on account information associated with the user account, and
    wherein the second portion of the user interface element includes an input user interface element.

18. The user device of claim 17, wherein the one or more processors are further configured to:
    detect a third user interaction, with the user device, that indicates the intermediate portion of the first user interface; and
    remove, from the second user interface and based on the third user interaction, the user interface element to expose the top portion of the first user interface and the second portion of the first user interface.

19. The user device of claim 17, wherein the one or more processors are further configured to:
    detect the second user interaction with the user device; and
    present, on the second user interface and based on the second user interaction, the first portion of the user interface element extending to contact the second portion of the user interface element to remove the gap.

20. The user device of claim 17, wherein the input user interface element includes a virtual keyboard.

* * * * *